United States Patent [19]

Baudreau et al.

[11] Patent Number: 4,757,613
[45] Date of Patent: Jul. 19, 1988

[54] CHAIN SAW EXTENSION STRUCTURE

[76] Inventors: Archie E. Baudreau, P.O. Box 1125, Modesto, Calif. 95353; Seldon J. Graham, 2225 Scenic Dr., Modesto, Calif. 95354; Bob Goad, 7961 Fox Rd., Hughson, Calif. 95326; Dean Brenner, 2908 Whitmore Ave., Ceres, Calif. 95307

[21] Appl. No.: 45,428

[22] Filed: May 4, 1987

[51] Int. Cl.$^4$ ............................................. B23D 57/02
[52] U.S. Cl. ............................................. 30/383; 30/382
[58] Field of Search ................... 30/386, 383, 382, 387

[56] References Cited

U.S. PATENT DOCUMENTS

| | | | |
|---|---|---|---|
| 3,949,817 | 4/1976 | Rice | 173/170 |
| 4,048,722 | 9/1977 | Howard | 30/386 |
| 4,359,822 | 11/1982 | Kolodziejczyk | 30/296 R |
| 4,515,423 | 5/1985 | Moore et al. | 339/28 |
| 4,520,563 | 6/1985 | Marceau | 30/122 |

FOREIGN PATENT DOCUMENTS 2075912 11/1981 United Kingdom ................. 30/386

Primary Examiner—E. R. Kazenske
Assistant Examiner—Willmon Fridie, Jr.
Attorney, Agent, or Firm—Harris Zimmerman; Howard Cohen

[57] ABSTRACT

The effective reach of a chain saw is increased by drive transmitting extension structure which is interposed between the cutting head and motor and handle unit. A first gearbox is attached against a side of the motor and handle unit and contains a pair of orthogonally positioned engaged bevel gears one of which is driven by the drive output element of the motor. A drive shaft extends forward from the first gearbox within a tubular extension arm to a second gearbox to which the cutting head is secured and which transmits drive to the cutting chain drive sprocket. The extension maintains the center of mass close to the operator to minimize strain on the operator and is largely free of exposed moving parts and structural convolutions that could entangle foliage during tree trimming operations or the like.

3 Claims, 3 Drawing Sheets

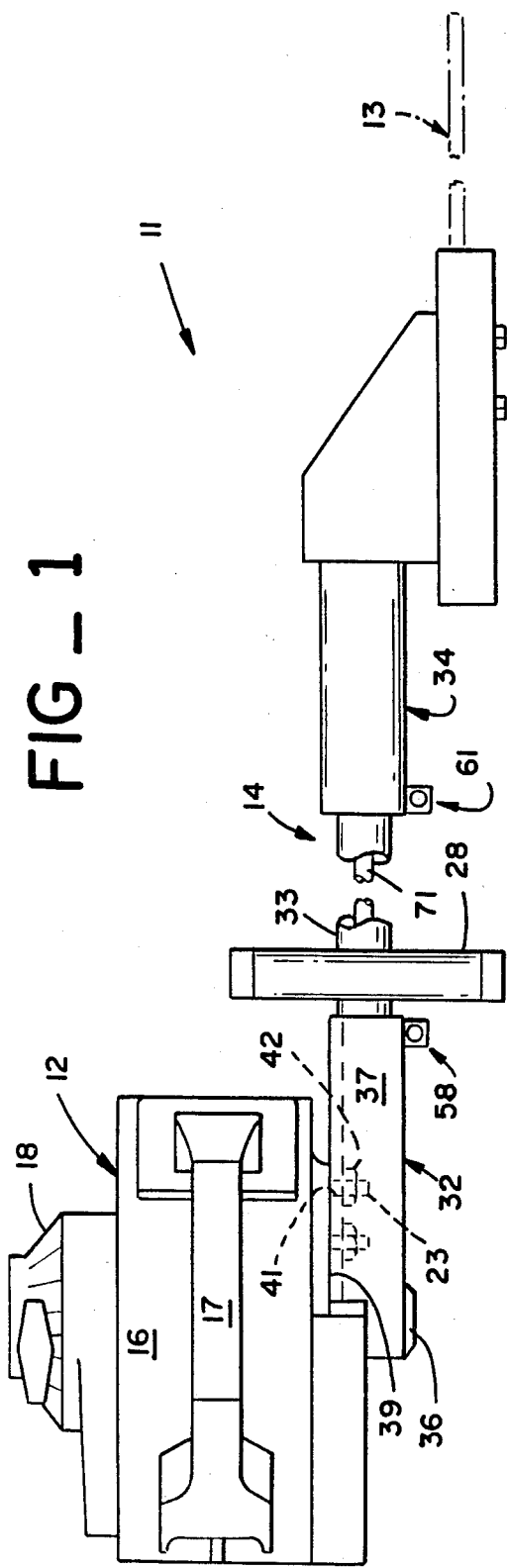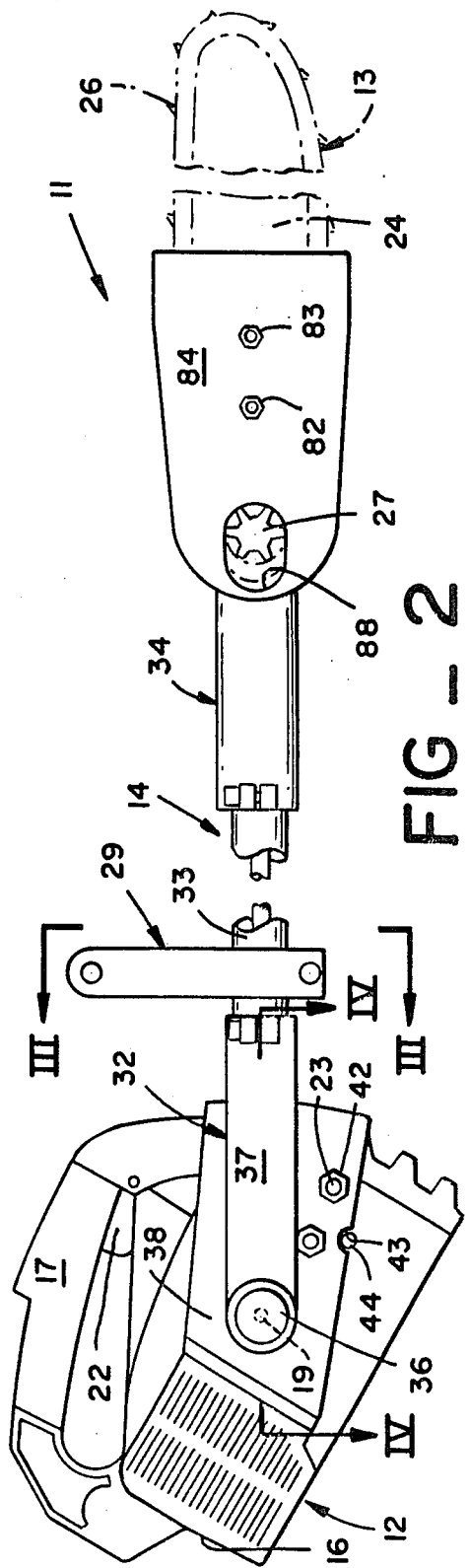

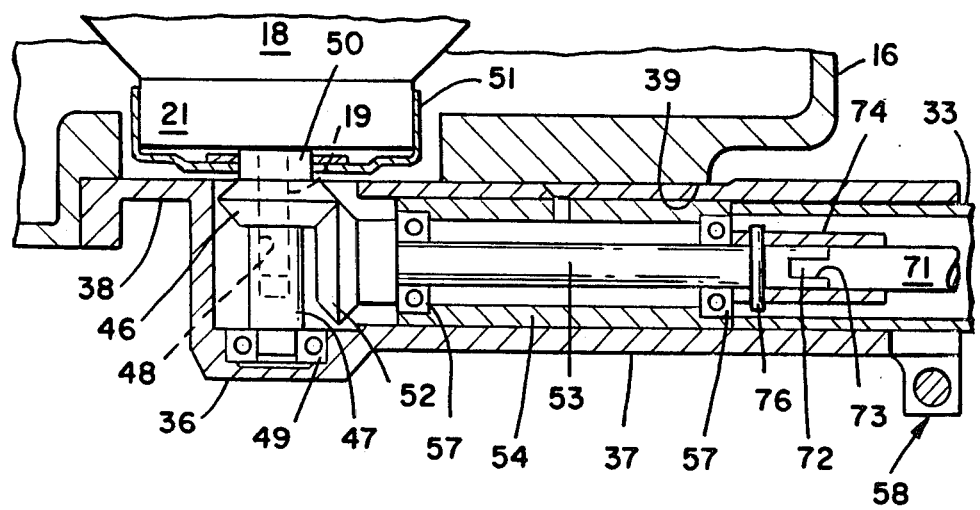
FIG_4
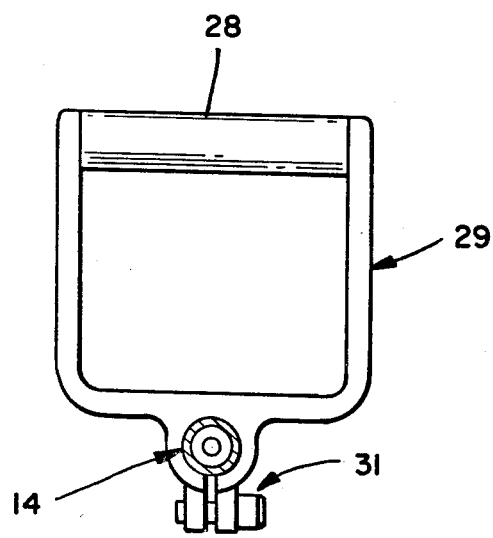
FIG_3

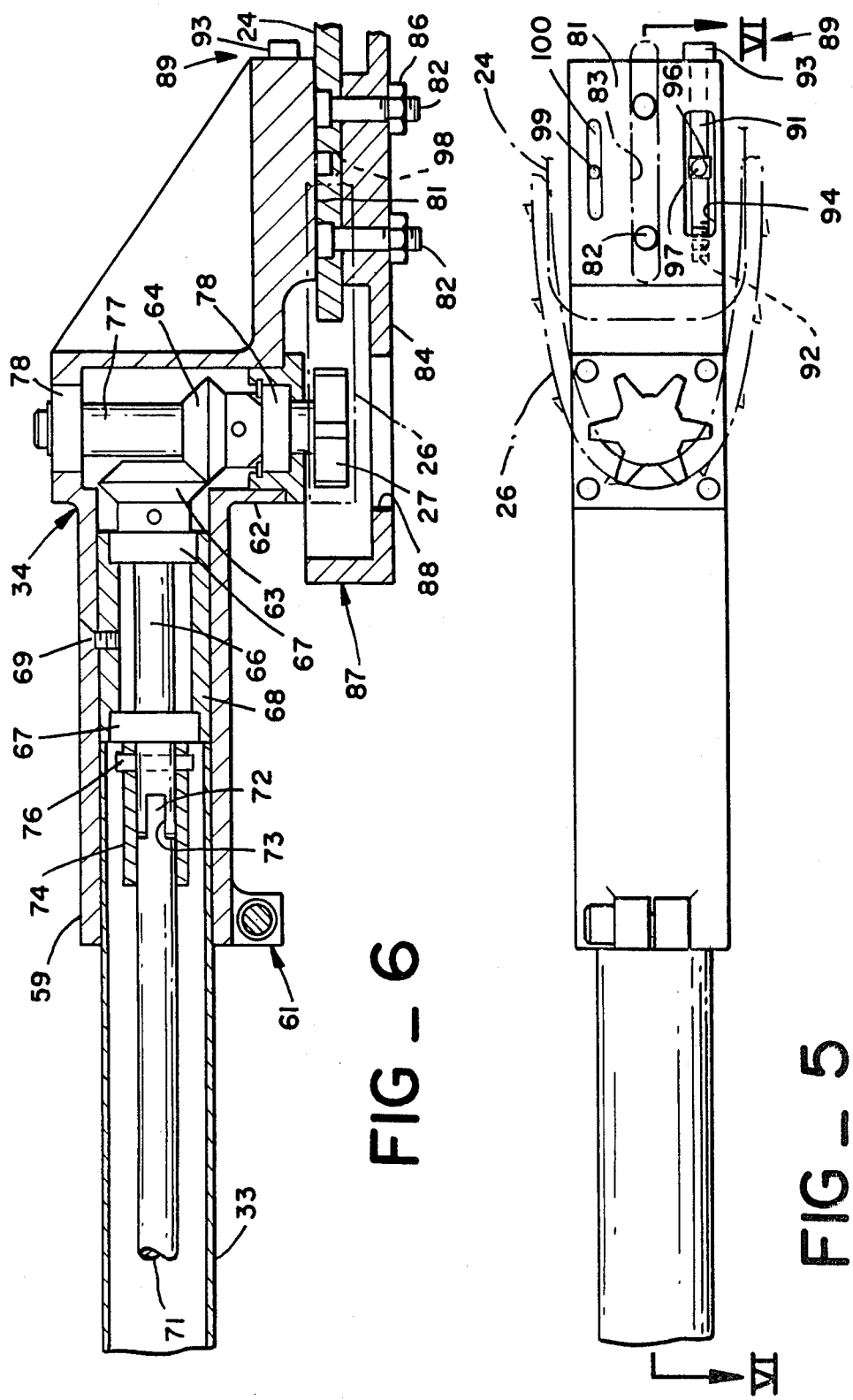

CHAIN SAW EXTENSION STRUCTURE

TECHNICAL FIELD

This invention relates to chain saws for trimming foliage, sawing logs and similar operations and more particularly to structure for extending the reach of chain saws by positioning the cutting head in spaced apart relationship from the motor and handle component.

BACKGROUND OF THE INVENTION

The conventional chain saw has a cutting head which extends outward from a motor and handle assembly typically for a distance of about one or two feet. Frequently the operator may be unable to stand immediately adjacent tree limbs or the like which are to be cut because of the elevation of the limbs, intervening foliage or for other reasons. The operator's arms can add another two or three feet to the effective reach of the saw but holding the somewhat heavy appliance with raised and/or extended arms increases muscular strain and can be very tiring.

In many work situations, the material which is be cut simply cannot be reached with the conventional chain saw by an operator standing on the ground. Climbing a tree or the like with an operative chain saw can be hazardous at least under some conditions. To avoid that problem, the operator must ascend a ladder, scaffolding or the like. This complicates the operation at best and may not always enable the operator to assume a comfortable untiring position. The best elevated supports for such operations, so called cherry pickers, are very costly and may not as a practical matter be available to many chain saw users.

Extensions have heretofore been devised for the purpose of extending the effective reach of a chain saw in order to minimize problems and complications of the above discussed kind. As heretofore constructed, such devices do not resolve the problems to the most desirable extent.

Some prior chain saw extenders are basically simply a pole which is attached to the chain saw body to enable the saw as a whole to be held several feet outward from the operator's body. This results in a cantilevering of the entire weight of the saw which greatly increases the muscular effort demanded of the operator.

A different type of prior chain saw extender is less tiring to support as it brings the center of mass closer to the operator's body. The cutting chain and chain guide are separated from the heavier drive motor housing and are then reconnected to the housing through an elongate drive transmitting assembly and by a brace. Prior chain saw extenders of this type reduce operator strain when cutting overhead tree limbs or the like but the advantage is partially offset by the weight, bulk and configurations of components which are added to effect the extension of the saw.

The prior construction for example requires introduction of a drive chain and additional sprocket as the cutting chain can no longer be directly engaged on the motor output sprocket. The exposed drive chain and additional sprocket add significant weight and complication and can be jammed by foliage or other objects that may be encountered in use. The drive transmitting extension and separate brace form structural junctions which can also entangle foliage and restrict manuverability. The prior construction also positions the cutting chain in angled relationship to the drive transmitting extension which can be convenient for cutting overhead limbs but which is awkward at best when the reach of the chain saw must be extended in a more horizontal direction. A construction which avoids or minimizes such problems would reduce operator strain and provide greater manuverability and versatility.

The present invention is directed to overcoming one or more of the problems discussed above.

SUMMARY OF THE INVENTION

In one aspect, the present invention provides extension structure for connecting the cutting head of a chain saw with a spaced apart motor and handle unit, the cutting head having a chain guide plate, a chain drive sprocket and a toothed chain fitted onto the periphery of the guide plate and being engaged with the drive sprocket. The motor and handle unit has a housing with at least one handle and a motor which is secured to the housing and has a drive output member located at one side of the housing and which turns about an axis that is orthogonal to the plane of the chain guide plate. The motor and handle unit also includes a centrifugal clutch driven by the drive output member which clutch has a drive output hub. The extension structure includes a first gearbox having first and second engaged bevel gears which are rotatable about orthogonal axes, means for attaching the first gearbox to the motor and handle unit with the first bevel gear being positioned at the one side of the housing in coaxial relationship with the drive output member and being coupled to the drive output member by a cylindrical drum which is secured to the first bevel gear in coaxial driving relationship with the first bevel gear, the drum being positioned and proportioned to replace the output hub of the centrifugal clutch. A second gearbox has third and fourth engaged bevel gears which are rotatable about orthogonal axes, means for attaching the cutting head to the second gearbox and means for coupling the fouth bevel gear to the chain drive sprocket in driving relationship. A tubular extension arm interconnects the first and second gearboxes and a rotary drive shaft extends axially within the extension in coaxial relationship with the second and third bevel gears to transmit drive between the second and third bevel gears.

In another aspect, the invention provides extension structure for connecting the cutting head of a chain saw with a spaced apart motor and handle unit, the cutting head having a chain guide plate, a chain drive sprocket and a toothed chain fitted onto the periphery of the guide plate and being engaged with the drive sprocket. The motor and handle unit has a housing with at least one handle and a motor which is secured to the housing and has a drive output member located at one side of the housing that turns about an axis that is orthogonal to the plane of the chain guide plate. The housing also has a flat surface at the one side and a pair of threaded studs extend outward from the surface. The extension structure includes a first gearbox having first and second engaged bevel gears which are rotatable about orthogonal axes, means for attaching the first gearbox to the motor and handle unit with the first bevel gear being positioned at the one side of the housing and being coupled to the drive output member in driven relationship. The attachment means includes a mounting plate of the first gearbox having a pair of spaced apart openings positioned to receive the pair of spaced apart studs when the first gearbox is disposed against the one side of the housing. A second gearbox has third and fourth engaged bevel gears which are rotatable about orthogonal axes, means for attaching the cutting head to the second gearbox and means for coupling the fourth bevel gear to the chain drive sprocket in driving relationship. A tubular extension arm interconnects the first and second gearboxes and a rotary drive shaft extends axially within the extension in coaxial relationship with the second and third bevel gears and is coupled to each of the second and third bevel gears to transmit drive therebetween.

The invention extends the effective reach of a chain saw while minimizing the additional effort that is required to support and manuver the lengthened tool. The extension structure provides a direct drive connection to the chain saw motor which is free of exposed moving mechanism and has a compact linear configuration which is less susceptible to entanglement with foliage and which is more adaptable to operations where the saw may need to be operated in a more or less horizontal orientation. In a preferred form of the invention, the length of the extended chain saw may easily be changed to accomodate to different working situations.

BRIEF DESCRIPTION OF THE DRAWINGS

FIG. 1 is a foreshortened top view of a chain saw with extension structure in accordance with a preferred embodiment of the invention.

FIG. 2 is a side view of the chain saw structure of FIG. 1.

FIG. 3 is a cross section view taken along line III—III of FIG. 2 and which depicts the forward handle of the chain saw.

FIG. 4 is a plan section view taken along line IV—IV of FIG. 2 and illustrating a first gearbox component of the extension structure.

FIG. 5 is a side view of a second gearbox component of the extension structure.

FIG. 6 is a plan section view of the second gearbox taken along line VI—VI of FIG. 5.

DETAILED DESCRIPTION OF THE PREFERRED EMBODIMENT

Referring initially to FIGS. 1 and 2 in conjunction, major components of an extended chain saw 11 in accordance with this embodiment of this invention include a motor and handle unit 12, a cutting head 13 and drive transmitting extension structure 14 through which the cutting head is attached to the motor and handle unit.

The motor and handle unit 12 may be of essentially conventional construction and has a housing 16 with a longitudinally extending handle 17 at the top shaped for gripping by one hand of the operator. A drive motor 18, which is of the electrical type in this example, is secured to housing 16 with the rotary axis of the motor and thus the drive output shaft 19 being oriented transversely with respect to the housing. A control switch or trigger 22 for manually actuating the motor 18 is provided in the conventional location at the forward end of the underside of handle 17.

A pair of spaced apart threaded studs 23 extend outward from a side surface 39 of housing 16 at a location which is forward from drive output shaft 19, the studs being similar to those which are used for securing a cutting head 13 directly to the housing in a conventional chain saw construction. In the present construction the studs 23 are used for securing the extension structure 14 to the housing 16 as will hereinafter be described in more detail.

While the chain saw 11 of this example is of the type which has an electrical motor 18, the invention is equally applicable to chain saws which are driven by a gasoline engine or the like.

Certain components of the cutting head 13 may also be of conventional form except insofar as such components are secured to the end of the extension structure 14 that is remote from housing 16 rather than being directly attached to the housing. Such components include an elongate chain guide plate 24 having a toothed endless cutting chain 26 fitted on to the periphery of the plate. Cutting chain 26 is engaged on a drive sprocket 27 at the back of guide plate 24 in essentially the conventional manner except insofar as the drive sprocket is mounted on the end of extension structure 14 rather than on the housing 16.

Referring to FIGS. 2 and 3 in conjunction, the chain saw 11 is provided with an additional handle 28 for grasping by the operator, the additional handle being transversely oriented on the saw 11 and being situated in front of housing 16. Handle 28 extends between the upright arms of a U-shaped bracket 29 which has a screw tensioned clamp 31 at the lower end that secures the bracket to the extension structure 14.

Primary components of the extension structure 14 include a first gearbox 32 which secures to a side surface 39 of housing 16 over the protruding end of the motor drive output shaft 19. A tubular extension arm 33 extends forward from the first gearbox to a second gearbox 34 which supports and drives the cutting head 13.

First gearbox 32 includes a gear casing 36, a tubular section 37 that extends forward from the gear casing and a mounting plate portion 38 that extends along the side of housing 16 against the housing side surface 39. The previously described threaded studs 23 extend through bores 41 in mounting plate 38 and nuts 42 are engaged on the ends of the studs to secure the gearbox 42 to housing 16. The portion of the mounting plate 38 in the region of studs 23 is thicker than the other portions to assure adequate strength and the mounting plate is provided with a notch 43 to accomodate to a chain tensioner pin 44 which typically projects from the side of a chain saw motor housing 16. The back end of mounting plate 38 in this example is angled outwardly in order to rest against an outwardly extending back portion of the housing 16 that is present on existing chain saws 11 of the particular model that the extension structure 14 of this embodiment was designed for.

Stud holes 41 in mounting plate 38 are located to cause the forward end of housing 16 to be tilted downward, typically at an angle of about 30°, when the extension structure 14 and cutting head 13 are in a horizontal orientation. this provides for comfortable gripping of the chain saw 11 by an operator both when the saw is used for trimming overhead limbs and when it is used for trimming or sawing material that is at or below the level of the operator's hands.

Referring now to FIG. 4, internal elements of the first gearbox 32 include a first bevel gear 46 with an integral axle shaft 47 which are positioned to be coaxial with the drive output members of motor and handle unit 12 which are the motor output shaft 19 and a centrifugal clutch 21 in this example. The protruding end of the motor output shaft 19 extends into an axial bore 48 in axle shaft 47 and the inner end of the axle shaft is supported and journalled for rotation by a needle bearing 50 on motor shaft 19. A ball bearing 49 mounted in the endwall of gear casing 36 supports and journals the other end of axle shaft 47. Bevel gear 46 is driven by a cylindrical drum 51 which is secured to the inner end of axle shaft 47 and which is similar to the original output hub of the centrifugal clutch 21 of motor and handle unit 12. The original output hub of the clutch 21 is removed and replaced with drum 51 when the extension structure 14 is installed on the chain saw.

To transmit the sideward drive from drum 51 in a forward direction, a second bevel gear 52 engages the first bevel gear 46, the two gears being rotatable about orthogonal axes. The second bevel gear 52 is secured to the end of another axle shaft 53 which extends along the axis of the tubular section 37 of gearbox 32. A coaxial sleeve 54, held in place by a screw 56, supports spaced apart ball bearings 57 which journal the axle shaft 53.

One end of the tubular extension arm 33 is fitted into the forward end of the tubular section 37 of first gearbox 32 and is held in place by a capscrew tightened clamp 58 formed on the end of the tubular section. Referring now to FIGS. 2 and 6 in conjunction, the opposite end of the tubular arm 33 is similarly fitted into the back end of a tubular section 59 of the second gearbox 34 and held in place by a clamp 61 at the end of the tubular section.

The drive path is turned sidewardly again at the second gearbox 34 which has a gear casing section 62, at the front of tubular section 59, that contains third and fourth bevel gears 63 and 64 respectively which are engaged and oriented for rotation about orthogonal axes. The third bevel gear 63 is secured to the forward end of an axle shaft 66 which extends along the axis of tubular section 59 and which is journalled by a pair of spaced apart ball bearings 67 which are seated at opposite ends of a sleeve 63, the sleeve being disposed coaxially within tubular section 59 and being held in place by a screw 69.

Referring jointly to FIGS. 4 and 6, drive is transmitted from the first gearbox 32 to second gearbox 34 by a drive shaft 71 which extends along the axis of tubular arm 33 and interconnects axle shafts 53 and 66 of the second and third bevel gears 52 and 63 respectively. A flat tongue 72 at each end of the drive shaft 71 extends into a matching slot 73 in the end of the adjacent axle shaft 53, 56 and is held in place by a sleeve 74 encircling the adjoining ends of each axle shaft and the drive shaft, the sleeves being secured in place by transverse pins 76 transpierced through the sleeves and axle shafts.

Referring now to FIG. 6 in particular, the fourth bevel gear 64 is secured to another axle shaft 77 which extends transversely in gear casing 62 and which is journalled by spaced apart ball bearings 78 at opposite sides of the casing. Axle shaft 77 extends out of the side of casing 62 and the cutting chain drive sprocket 27 is secured to the outer end of the shaft.

Referring to FIGS. 5 and 6, the back end of the chain guide plate 24 is disposed against a side surface of a forwardly extending bracket 81 of the gearbox 34 in alignment with the chain drive sprocket 27. Spaced apart threaded studs 82, which may be similar to the conventional chain guide mounting studs of a chain saw, extend outward from bracket 81 through a longitudinal slot 83 in the chain guide plate 24. Studs 82 extend further outward through a chain guard 84 and the chain guide plate 24 and chain guard are secured in place by nuts 86 threaded onto the ends of the studs. The cutting chain 26 is fitted onto the periphery of the chain guide plate 24 and engaged on chain drive sprocket 27 in the known manner.

The chain guard 84 is a plate covering the outer side of the back portion of the cutting chain 26 and chain guide 24 and also the drive sprocket 27. The guard 84 has an inwardly directed rim 87 which extends over, under and behind such elements. The guard 84 contributes to safety and avoids entanglement of foliage or the like in the moving parts at the drive sprocket region. A small window 88 may be present in the guard 84 to provide for inspection and access to the drive sprocket 27 without detracting from these objectives.

A chain tension adjuster 89 is built into bracket 81 and includes a threaded rod 91 which extends into a bore 92 that is parallel to the chain guide plate 24, the rod having a knurled turning knob 93 at the outer end. A rectangular slot 94 in the side of bracket 81 intersects the midportion of bore 92 and a rectangular rider element 96 is disposed in the slot and has internal threads engaged by the threaded rod so that turning of knob 93 slides the rider forwardly or backwardly depending on the direction of rotation. A pin 97 extends outward from rider 96 into an aperture 98 in chain guide plate 24. Thus if nuts 86 are loosened, turning of knob 93 in one direction forces the guide plate 24 forward to increase chain tension while opposite rotation of the knob draws the guide plate backward to relieve tension. A fixed pin 99 which extends outward from bracket 81 into a longitudinal slot 101 in guide plate 24 limits movement of the guide plate relative to bracket 81.

Referring again to FIGS. 1 and 2, the chain saw 11 may be operated in essentially the normal manner except insofar as the reach of the tool is greatly extended both in the vertical and horizontal directions. By grasping handle 17 with one hand and handle 28 with the other, the operator may trim tree limbs that would otherwise require use of a ladder, scaffold or the like and may also reach out in a more horizontal direction through foliage or other obstructions to saw a limb or the like. As the extension structure 14 and cutting head 13 components are relatively light in comparison with the motor and handle unit 12, the center of mass remains close to the operator thereby enabling cutting of tree limbs or the like that are not immediately adjacent the operator with reduced effort and muscular strain. The extension structure 14 is also largely free of exposed moving parts which could be jambed by foliage and is free from structural convolutions which might tend to entangle foliage.

In the preferred form of the invention as described above, the length of the extended chain saw 11 may easily be changed to accomodate to different working situations. Clamps 58 and 61 may be loosened after which tubular arm 33 and drive shaft 71 may be replaced with similar components of longer or shorter length.

While the invention has been described with respect to a single preferred embodiment for purposes of example, many variations and modifications of the structure are possible and it is not intended to limit the invention except as defined in the following claims.

We claim:

1. Drive transmitting extension structure for connecting the cutting head of a chain saw with a spaced apart motor and handle unit thereof, said cutting head having a chain guide plate, a chain drive sprocket and a toothed cutting chain fitted onto the periphery of said guide plate and being engaged with said drive sprocket, said motor and handle unit having a housing with at least one handle and having a motor secured to said housing and having a drive output member located at one side of said housing and which turns about an axis that is orthogonal to the plane of said chain guide plate, and wherein said motor and handle unit includes a centrifugal clutch driven by said output member which clutch has a drive output hub, wherein said drive transmitting extension structure comprises:
- a first gearbox having first and second engaged bevel gears which are rotatable about orthogonal axes, means for attaching said first gearbox to said motor and handle unit with said first bevel gear being positioned at said side of said housing in coaxial relationship with said drive output member and being coupled to said drive output member in driven relationship therewith, and wherein a cylindrical drum is secured to said first bevel gear in coaxial driving relationship therewith, said drum being positioned and proportioned to replace said output hub of said centrifugal clutch,
- a second gearbox having third and fourth engaged bevel gears which are rotatable about orthogonal axes, means for attaching said cutting head to said second gearbox and means for coupling said fourth bevel gear to said chain drive sprocket in driving relationship therewith,
- a tubular extension arm interconnecting said first and second gearboxes, and
- a rotary drive shaft extending axially within said extension arm in coaxial relationship with said second and third bevel gears and having means for coupling to each thereof to transmit drive therebetween.

2. Drive transmitting extension structure for connecting the cutting head of a chain saw with a spaced apart motor and handle unit thereof, said cutting head having a chain guide plate, a chain drive sprocket and a toothed cutting chain fitted onto the periphery of said guide plate and being engaged with said drive sprocket, said motor and handle unit having a housing with at least one handle and having a motor secured to said housing and having a drive output member located at one side of said housing and which turns about an axis that is orthogonal to the plane of said chain guide plate, wherein said housing has a flat surface at one side thereof and wherein a pair of spaced apart threaded studs extend outward from said surface, wherein said drive transmitting extension structure comprises:
- a first gearbox having first and second engaged bevel gears which are rotatable about orthogonal axes, means for attaching said first gearbox to said motor and handle unit with said first bevel gear being positioned at said side of said housing and being coupled to said drive output member in driven relationship therewith, and wherein said means for attaching said first gearbox to said motor and handle unit includes a mounting plate of said first first gearbox having a pair of spaced apart openings therein positioned to receive said pair of spaced apart studs when said first gearbox is disposed against said one side of said housing,
- a second gearbox having third and fourth engaged bevel gears which are rotatable about orthogonal axes, means for attaching said cutting head to said second gearbox, and means for coupling said fourth bevel gear to said chain drive sprocket in driving relationship therewith,
- a tubular extension arm interconnecting said first and second gearboxes, and
- a rotary drive shaft extending axially within said extension arm in coaxial relationship with said second and third bevel gears and having means for coupling to each thereof of transmit drive therebetween.

3. The apparatus of claim 2 wherein said pair of spaced apart openings are located to position the forward end of said motor and handle unit in a downwardly tilted orientation when said tubular extension arm is held in a horizontal orientation, and wherein said chain guide plate extends from said second gearbox in a substantially parallel relationship with said tubular extension arm.

* * * * *